United States Patent [19]

Shum

[11] 4,398,863
[45] Aug. 16, 1983

[54] PICK AND PLACE ROBOT

[75] Inventor: Lanson Y. Shum, Salem Township, Westmoreland County, Pa.

[73] Assignee: Westinghouse Electric Corp., Pittsburgh, Pa.

[21] Appl. No.: 264,152

[22] Filed: May 15, 1981

[51] Int. Cl.³ ............................................. B25J 9/00
[52] U.S. Cl. ................... 414/733; 414/709; 414/4; 414/744 R
[58] Field of Search ........... 414/733, 732, 735, 744 R, 414/744 A, 709, 4

[56] References Cited

U.S. PATENT DOCUMENTS

| 1,766,574 | 6/1930 | Westin et al. | 414/733 |
| 2,904,192 | 9/1959 | Reynolds et al. | 414/733 |
| 3,182,813 | 5/1965 | Goodell et al. | 414/733 |
| 3,924,754 | 12/1975 | Reis et al. | 414/733 |
| 4,283,165 | 8/1981 | Vertut | 414/733 |

FOREIGN PATENT DOCUMENTS 2045720  11/1980  United Kingdom ................ 414/735

Primary Examiner—Robert J. Spar
Assistant Examiner—Terrance L. Siemens
Attorney, Agent, or Firm—E. C. Arenz

[57] ABSTRACT

A pick and place robot is provided in which support 10 carries a rotatable turret 12, which in turn has one end of the pick and place arm 14 pivotally carried therefrom, the arm carrying a working tool 16 at its other end supported in rotatable relation and connected to constant orientation means 62, 64, 66 which maintains the working tool in a given disposition throughout the extent of the swing of the arm from a pick to a place location, both the turret and the arm being driven independently by its own drive.

1 Claim, 10 Drawing Figures

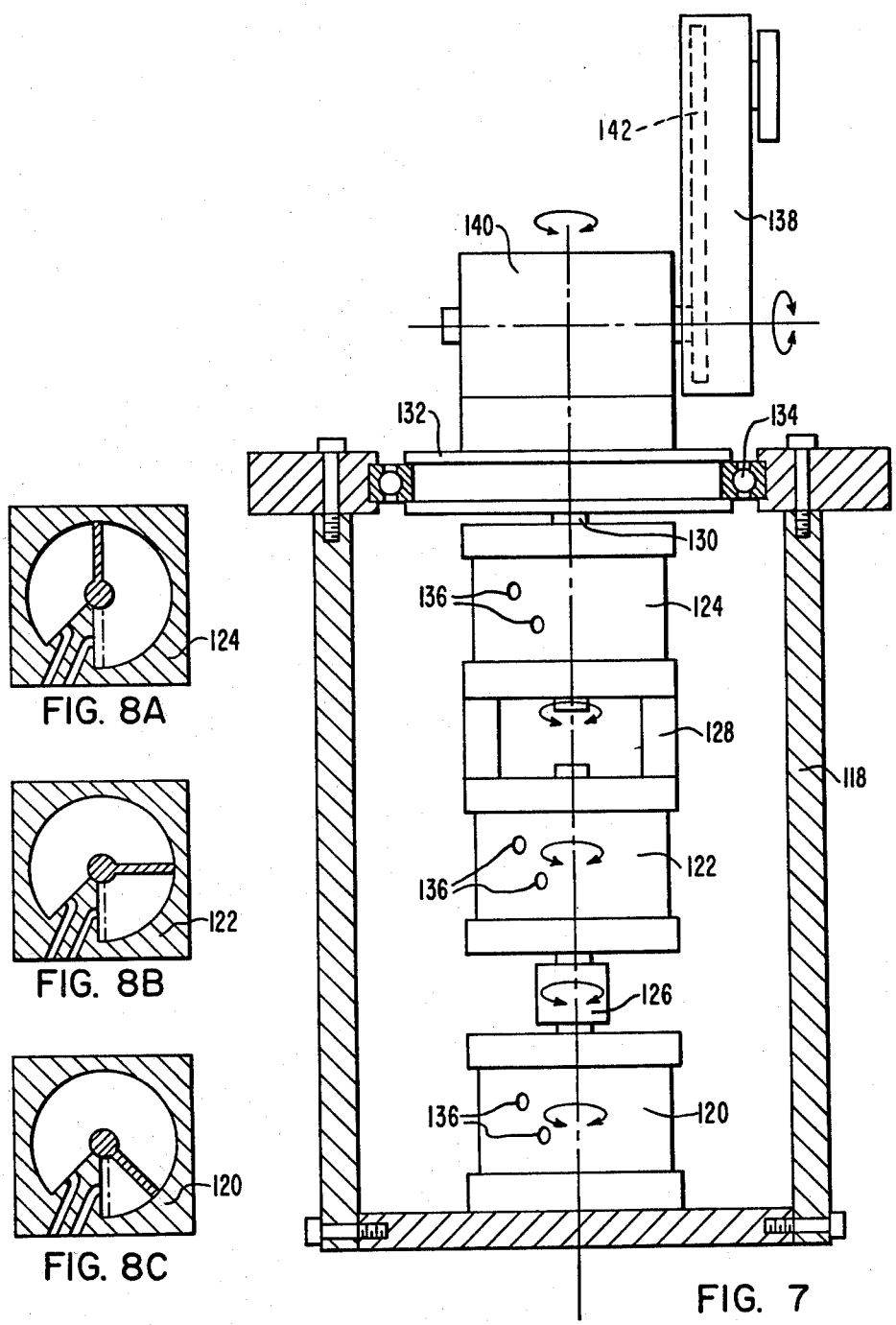

4,398,863

PICK AND PLACE ROBOT

BACKGROUND OF THE INVENTION

This invention pertains to the art of robot structures designed to perform a pick and place function.

Among the current designs of assembly robots, there are two general types which are considered of interest in connection with this invention. One type is the fixed sequence, two-point pick and place robot which is basically limited to picking from one location and placing at another location. Such two-point robots have the advantages of being simple, accurate, of high speed and relatively low cost. The other type of robot is the fully position-programmable servo-controlled robot which can be programmed to pick and place in infinitely variable positions. The extreme flexibility of the servo-controlled robot is its principal advantage but it is much more complex, less accurate, of lower speed, and many times more expensive and difficult to maintain relative to the simple two-point pick and place robot.

One aim of this invention is to provide a pick and place robot which has most of the apparent advantages of the two-point pick and place arm with respect to accuracy, speed and cost, but is also adapted to be operated in a mode in which a multitude of pick and place locations are available so, in effect, the robot of the invention bridges the functional gap between the two types of pick and place robots. It is a further aim of the invention to provide a robot structure for pick and place service in which in most instances the path of the working tool is of a generally smooth arcual character to obtain the benefits of smooth acceleration and deceleration motions.

SUMMARY OF THE INVENTION

In accordance with one preferred form of the robot structure, a support structure carries a turret which is rotatable about one axis, and one end of a swinging arm is carried by the turret and is rotatable about another axis normal to the first axis for a swinging movement up to about a half circle. Constant orientation means is provided in association with the turret and arm and at its outer end is connected to the working tool at the end of the arm to maintain the orientation of the axis of the working tool in one given position irrespective of movement of the arm and the turret. Thus, assuming the article to be picked and placed is to be in a vertical disposition at both locations, the constant orientation means functions to maintain the working tool, such as a gripper, in a position to pick up the item in a vertical disposition and maintain it in that vertical disposition throughout the path of travel to the place location.

BRIEF DESCRIPTION OF THE DRAWINGS

FIG. 7 is an end view of still another form of structure of a robot which is arranged to employ pneumatic vane actuator motors as distinct from the servo motors illustrated in connection with the device of FIGS. 1-3.

FIGS. 8A-C are horizontal sectional views through the three pneumatically actuated motors of FIG. 7.

DETAILED DESCRIPTION OF PREFERRED EMBODIMENTS

Figure 2:
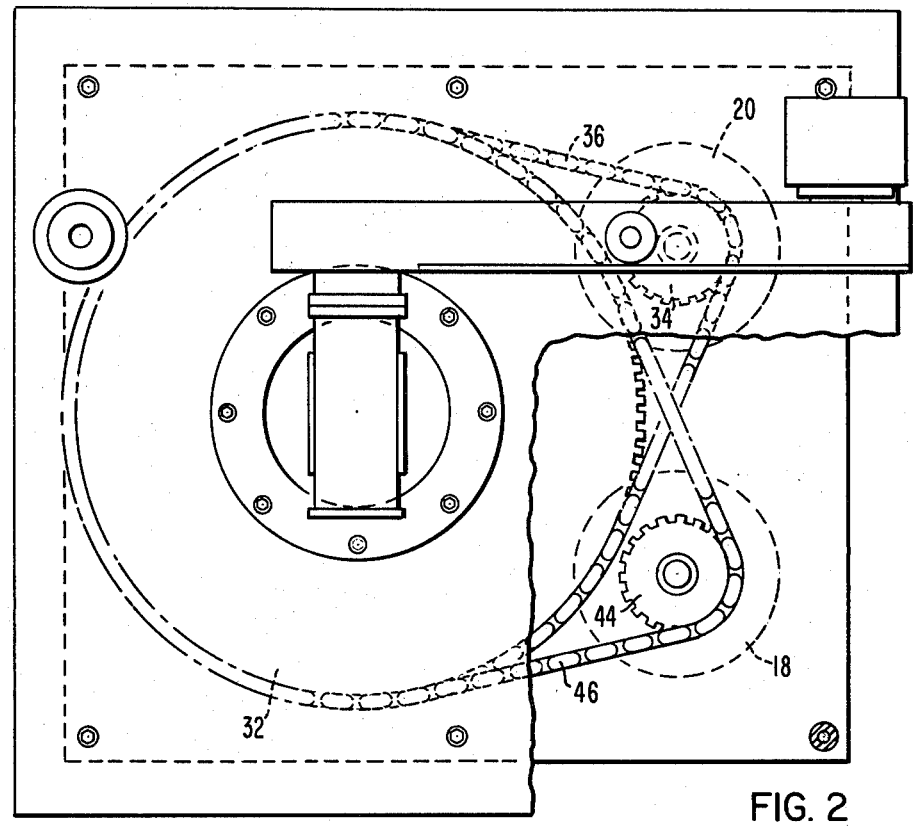
FIG. 2 is a plan view of the structure of FIG. 1.
Figure 1:
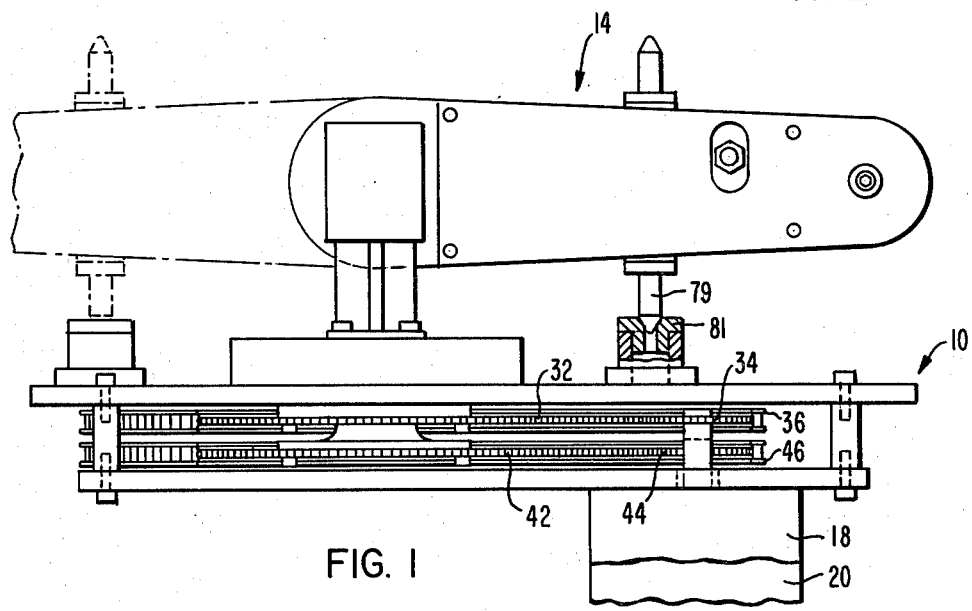
FIG. 1 is a side elevation view, partly broken and fragmentary, of one form of robot structure according to the invention.
Figure 3:
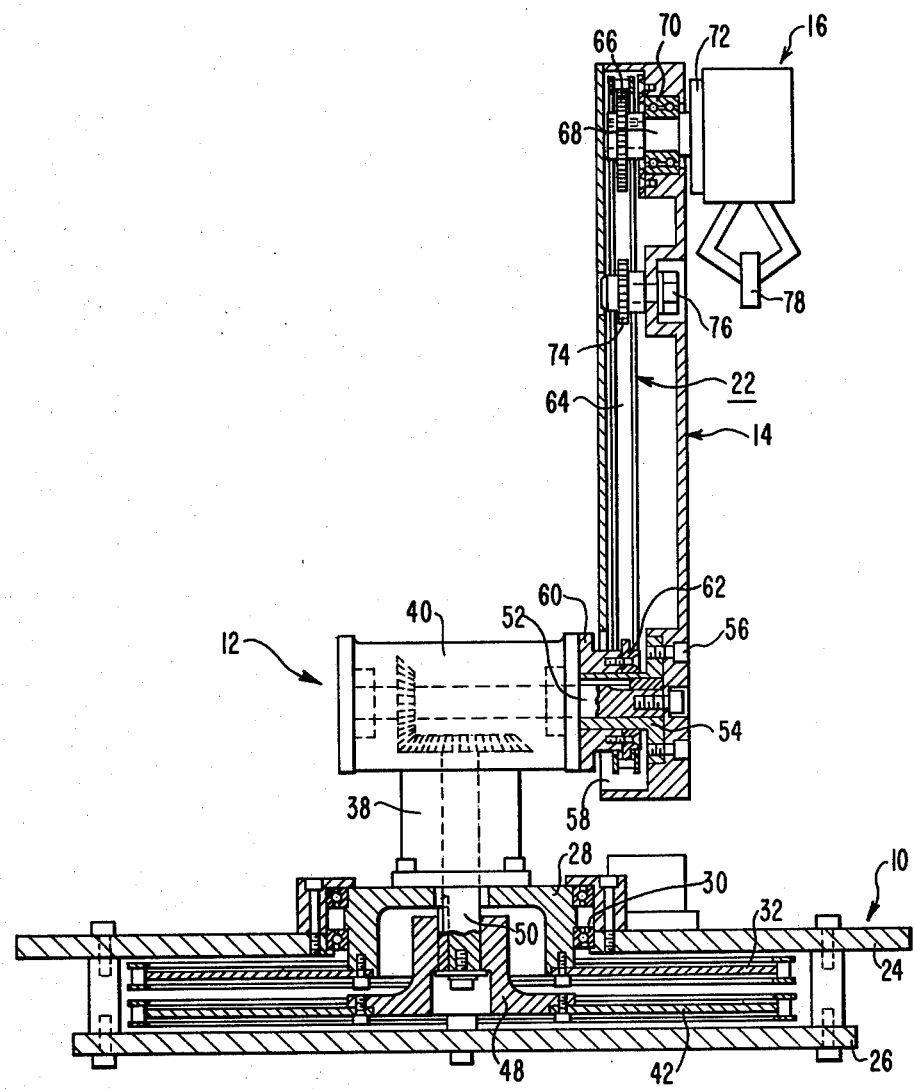
FIG. 3 is an end view, mostly in section, of the robot structure of FIG. 1.

FIGS. 1-3 illustrate one preferred embodiment of a robot according to the invention. The major elements include a support structure generally designated 10 which has mounted thereon a turret 12 rotatable about a vertical axis, a swinging arm 14 having one end pivotally supported from the turret for swinging movement of the arm about an axis normal to the vertical axis, a working tool such as a gripper 16 at the other end of the arm, first and second independent drive means 18 and 20 for independently rotating the turret, and swinging the arm, respectively, and constant orientation means 22 in the arm for maintaining a given disposition or orientation of the working tool throughout its range of movements.

The support structure is a horizontal platform comprised of a pair of vertically spaced plates 24 and 26, the upper of which supports the base 28 of the turret 12 through the angular contact bearing arrangement 30. The reasons for the desirability of such a bearing arrangement are noted in my copending U.S. patent application Ser. No. 264,153, filed May 15, 1981. The base of the turret has a driven sprocket 32 fixed thereto and arranged to be driven from a drive sprocket 34 (FIGS. 1 and 2) on the shaft of first drive motor 18, with a chain 36 linking the drive and driven sprockets. The first driving means 18, which conveniently may be a conventional DC servo motor, when energized rotates the base 28 and accordingly the trunk 38 and head 40 of the turret through any predetermined degree of angular rotation independent of any movement of the swinging arm 14.

The swinging arm 14 (FIG. 1) is adapted to be driven between the opposite positions shown in full and dashed lines, that is, through a half circle between opposite horizontal positions. The second drive means 20 drives driven sprocket 42 through drive sprocket 44 and chain 46 in a manner similar to that described in connection with the first drive means. The hub 48 to which the driven sprocket 42 is attached is keyed to shaft 50 which serves as the input for the right angle drive in the trunk and head of the turret. The right angle drive is conventional with its output being through shaft 52 which is keyed to the mounting flange 54 to which, through the fasteners 56, the one end of the arm 14 is attached for rotation with the shaft.

The arm 14, which is of a generally hollow box shape in transverse cross section, is provided with a generally open area 58 on its rear face at the one end which is pivotally carried by the turret. This open area encompasses a ferrule shaped piece 60 fastened to the turret and in turn having fastened to it in fixed relation a sprocket 62 which is linked by a chain 64 to a sprocket 66 at the working head end of the arm and which is rotatably carried thereby. The rotatable sprocket 66 is keyed to shaft 68 which passes through bearings 70 mounted in the arm, the shaft 68 in turn being fixed to the working head plate 72 to which the working tool 16 is attached. With this arrangement, the sprocket 66 can turn within the arm 14 and this in turn will result in the working tool 16 rotating correspondingly relative to the arm 14. To promote the elimination of backlash, an idler sprocket 74 is provided in the arm intermediate the length of the chain and, through shifting of the idler mounting bolt 76 transverse to the run of the chain, the proper tensioning of the chain can be obtained.

The operation of what is herein called the constant orientation means, which includes the sprocket 62 fixed relative to the turret, the rotatable sprocket 66 connected to carry the working tool 16, and the linking chain 64, is generally as follows. As the arm 14 is swung from one position to another, the chain 64 will walk around the fixed sprocket 62 and cause rotation of the rotatable sprocket 66 relative to the arm. This in turn causes corresponding rotation of the working tool 16 relative to that part of the arm to which it is connected, and accordingly, the working tool and the object 78 being handled by the working tool will maintain the same absolute disposition or orientation regardless of the swinging of the arm. Thus, with the arm being in an upright position in FIG. 3, it is seen that the longitudinal axis of the object 78 is vertical. If the working tool 16 and the carried object were also shown in FIG. 1 where the arm is at opposite positions, the longitudinal axis of the object 78 would also be seen to be vertically disposed. This situation prevails irrespective of what point throughout the 180° arc the arm is swung. One particular advantage of this arrangement is that if the pick and place locations are at different elevations, or are subject to the changed in elevational relation from time to time, the object 78 is always in the vertical disposition throughout its path of movement.

In order to accurately register the swing arm 14 to each pick and place locations, when the swing arm is lowered to the horizontal position, shot pins 79 (FIG. 1) may be located on the top and bottom of the arm to engage hardened bushings 81. The bushings define the rotation of the turret and the vertical position of the swing arm. Accordingly, if the robot is designed to operate at 20 pick and place points, there will be 20 bushings spaced at the desired locations.

Figure 4:
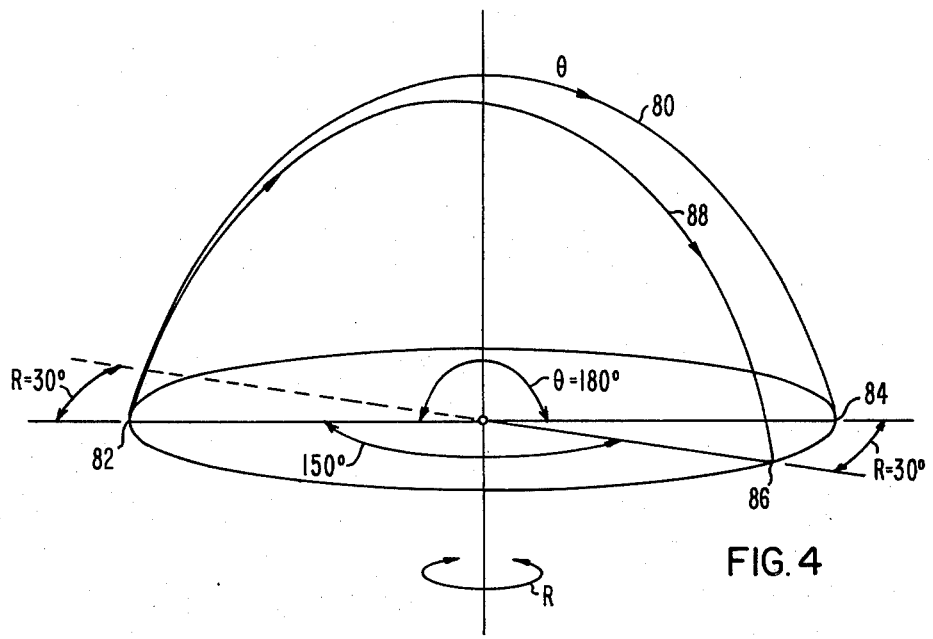
FIG. 4 is a representation illustrating two different paths that the working tool may take in two different modes of operation of the robot of FIGS. 1-3.
Figure 5:
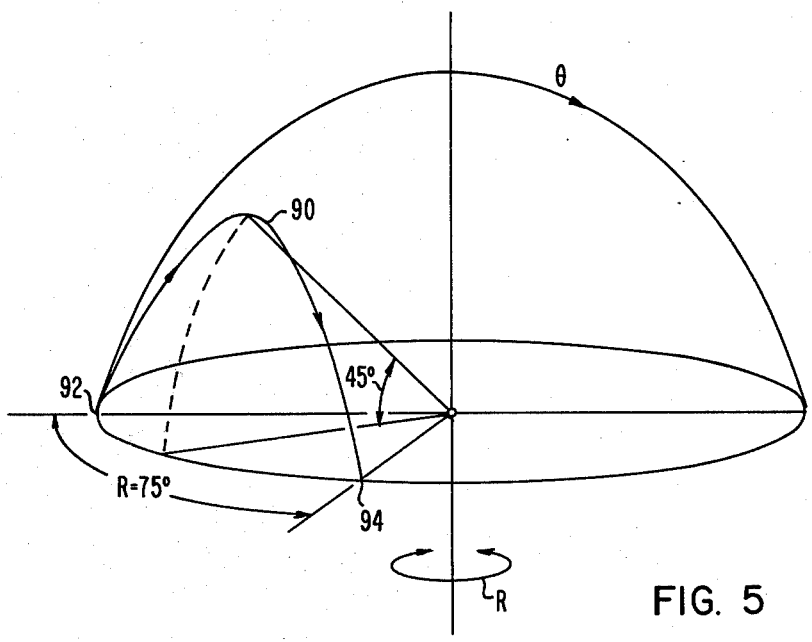
FIG. 5 is a representation of an additional example of a path the working tool may take in another mode of operation of the robot.

Examples of possible paths of movement for the robot in a pick and place operation are illustrated in FIGS. 4 and 5. In FIG. 4, the line 80 indicates a path from a pick location 82 to a place location 84 which is directly opposite the pick location. In this case, the arm 14 alone swings and the turret remains in a fixed position. The motion of the swinging arm in which it completes a full 180° of angular movement is considered to be a relatively smooth movement in that there is initially smooth acceleration at the location and smooth deceleration at the place location. In that sense, the motion is the inverse of the motion of a simple pendulum. The robot according to the invention is considered particularly advantageous with respect to many prior art robots which include a rotatable trunk, carrying a tiltable (but not capable of 180° swinging motion) arm and with the arm frequently being extendable and retractable. With such an arm, the motion for a pick and place operation is basically that the arm picks, accelerates upwardly to some degree and then must decelerate to stop, and with the arm then being rotated by the trunk to the place location, with the arm then again being accelerated and decelerated in its descent to the place location.

In some instances, it may be desirable to place an object at a location which is not directly across a circle from the pick location. The path of movement of the working tool when the place location 86 is 150° removed on a horizontal circle from the place location 84 is illustrated by the line 88. In this case, the arm 14 is again swung through the full 180° swinging movement with the advantageous acceleration and deceleration characteristics. However, through some portion of the swinging movement of the arm, the turret 12 is angularly displaced the 30° so that the working tool will descent at the location 86. The return path of the working tool will again follow the line 88, with the full swing of the arm, and the reverse rotation of the turret for 30°.

Referring now to FIG. 5, there may be instances where, with the structure illustrated in FIGS. 1 to 3, the object being carried is of a shape that it would be unable to clear the arm 14 in a 180° swing. Also, the pick and place locations may be within a single quadrant of a horizontal circle. Lone 90 indicates one path of a working tool when the pick location 92 and place location 94 are 75° apart on a horizontal circle. In this case, the arm 14 is swung upwardly for perhaps 45°, then stopped and reversed to descend 45° while at the same time, the turret is rotating 75°. This movement has the disadvantage of requiring stopping of the swinging arm with the concomitant deceleration and acceleration in the middle of its movement. However, it is my view, at this time at least, that the most important factor to be considered in determining the path of the working head in the sense of turret turning as against arm swinging, is the time it takes to go from the pick to the place location. Thus, it may normally be expected that if the pick and place locations are located less than 90° apart, that is in one quadrant, the path of travel will include reversing the movement of the swinging arm. For the pick and place locations more than 90° apart, a full 180° swing of the arm coupled with turret rotation will be the preferred mode of operation.

Figure 6:
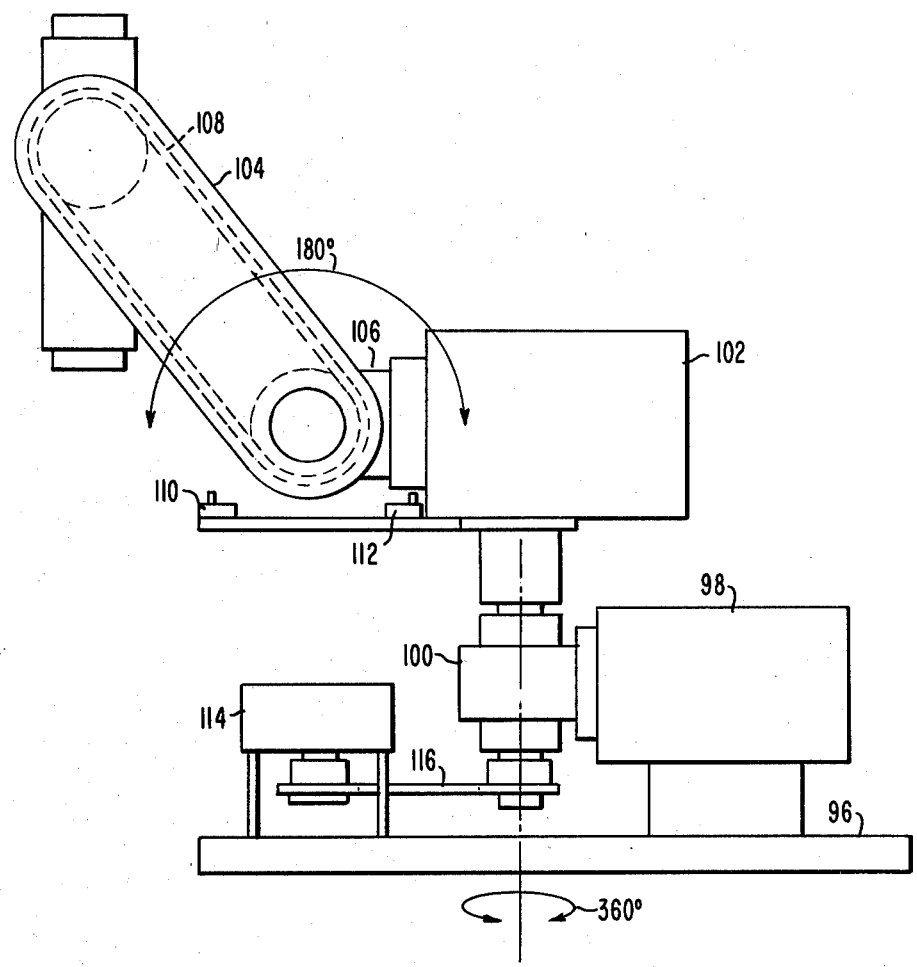
FIG. 6 is a primarily diagrammatic side elevation of another form in which the structure of the invention may be embodied.

A robot according to the invention may take other forms than that specifically described in connection with FIGS. 1–3. In FIG. 6, the support platform 96 carries the first motor means 98 which, through a right angle drive 100 functions to rotate the turret which carries the second motor drive 102. The swinging arm 104 is pivotally carried from the right angle drive 106 for movement through 180°. The swinging arm 104 is also provided interiorly with the constant orientation means 108 schematically illustrated and of the same character as that described in detail in connection with FIG. 3. The device of FIG. 6 is also provided with position sensing and feedback means which can include a pair of microswitches 110 and 112, for example, to define the ends of travel of the swinging arm. The rotated position of the robot may be sensed and controlled through the use of a servopot 114 which is coupled to the rotated shafting through the linking means 116.

In some applications, a simple 180° swinging motion will be the only motion required. In this case, the parts of the assembly of FIG. 6 directed to rotation of the turret are omitted and the base platform simply supports the second drive motor 102 and associated parts.

Referring to FIGS. 7 and 8, another example of a robot according to the invention is shown in which the first drive means for rotating the turret comprises a plurality of pneumatic vane actuators in a cascade relation, and the second drive means for swinging the arm is a single pneumatic vane actuator. The support structure 118 has mounted thereon in vertical stacked relation three vane actuators 120, 122, and 124. The shafts of the two bottom vane actuators are coupled for rotation together as at 126. The bodies of the top two actuators are coupled together as at 128. The output shaft 130 of the top actuator is coupled to the turret platform 132 which in turn is supported from the support structure for rotation through the bearings 134.

The actuators 120-124 are provided with physical stops to limit the opposite angular positions to which the vanes can turn to, respectively, 45°, 90° and 180°. These limited positions are illustrated in the sections of FIG. 8 which correspond to the vane actuators on the same level in FIG. 7. Each of the vane actuators is operated independently by pneumatic pressure through the illustrated ports, all given the numeral 136.

With the arrangement as shown and described, the turret platform 132 can be rotated to any of eight distinct angular positions, each of which is 45° apart from the other with the three vane actuators and the designated limit positions of each actuator. This occurs in the following way. If 45° rotation of the turret is desired, the bottom vane actuator 120 is operated to its solid line position, while the other two vane actuators have their vanes remaining in the dashed line positions. Since the shaft of the bottom actuator turns 45°, the shaft of the second actuator 122 will correspondingly be turned 45°. However, this results in the body of both the second and third actuators, 122 and 124 rotating 45°, and this in turn results in the shaft 130 of the top actuator turning 45° in the same direction as the bottom actuator. If a 90° rotation of the turret base 132 is desired, the second actuator 122 is operated to its solid line position, while the bottom actuator 120 and top actuator will remain in their dashed line positions so that the 90° rotation of the turret base 132 occurs through the rotation of the bodies of actuators 122 and 124 and the corresponding 90° rotation of the top actuator shaft 130. If both the bottom and middle actuators 120 and 122 are operated to their solid line positions, the 90° and 45° are added to equal a rotation of 135° of the turret base. Rotation of 180° occurs through operating only the top actuator 124 so that its vane moves to the solid line position while the vanes of actuators 120 and 122 remain in their dashed line positions. The addition of selected ones of the three angular displacements can also give rotation of 225°, 270°, and 315° through selective addition.

The limits at multiples of 45° for the three actuators, and the use of the three actuators results in the particular rotative positions given as examples. It will be appreciated, of course, that the use of additional actuators, and with other angular limit positions can provide a multitude of different angular position locations with respect to the rotation of the turret.

The swinging arm 138 is also arranged to be driven by a pneumatic vane actuator 140 which is mounted on the turret base 132. The vane actuator 140 will typically be limited to two opposite positions approximately 180° apart so that the arm swings through about a half circle as has been described in connection with the previous embodiments. Again, it is considered preferable that the swinging arm be provided with the constant orientation means for maintaining the disposition of the working tool in a single orientation throughout its range of movement. The constant orientation means is illustrated in schematic form by dashed lines and is indicated by the numeral 142 in FIG. 7.

I claim:
1. A pick and place robot structure comprising:
   a fixed support structure;
   a rotatable turret carried by said support structure for rotation about one axis;
   an arm having one end portion pivotally carried by said turret for swinging movement of the arm about a second axis normal to said one axis to carry the other end portion of the arm through an arc of up to about a half circle;
   a working tool, such as a gripper, carried at said other end portion of said arm;
   first drive means to swing said arm;
   second drive means carried by said support structure, and operable independently of said first drive means to rotate said turret;
   constant orientation means associated with said turret structure at said one end portion of said arm and connected to said working tool at said other end portion of said arm to maintain the orientation of the axis of the working tool in one given orientation irrespective of movement of said arm and said turret, so that the disposition of the object being carried from a pick location to a place location by the working tool of the robot remains the same between the two locations;
   said first drive means is supported by said support structure and connected through said turret to effect swinging of said arm;
   said constant orientation means includes a linking mechanism including a first sprocket fixed against rotation to said turret in a location concentric to said second axis, a second sprocket rotatably connected to said arm at said other end portion of said arm, said second sprocket being fixedly connected to said working tool to effect rotation of said tool in accordance with rotation of said second sprocket, and toothed linking means connecting said sprockets so that as said arm is swung, said linking means walks around said first sprocket and effects rotation of said second sprocket in accordance with the degree of swing of said arm;
   said first and second drive means include a lower driven sprocket and an upper, parallel, co-axial, driven sprocket, respectively;
   said upper driven sprocket having fixed thereto an inverted cup-shaped element rotatably carried by said support structure and serving as the base of said turret and fixedly attached thereto;
   said lower driven sprocket being connected to shaft means extending co-axially and rotatably through said cup-shaped element into said turret, right angle drive means in said turret for transmitting motion of said shaft means to right angle shaft means fixed to said arm to effect swinging of said arm in accordance with rotation of said right angle shaft means.

* * * * *